United States Patent [19]

Byars

[11] 4,282,854
[45] Aug. 11, 1981

[54] CHARCOAL LIGHTER

[75] Inventor: Garner B. Byars, Corinth, Miss.

[73] Assignee: Auto Fire Corporation, Corinth, Miss.

[21] Appl. No.: 42,910

[22] Filed: May 25, 1979

[51] Int. Cl.$^3$ ............................................. F24B 3/00
[52] U.S. Cl. ................................. 126/25 B; 126/29; 206/506
[58] Field of Search .................. 126/25 R, 25 B, 283, 126/24, 29, 30; 44/34, 38, 39, 40, 41; 206/506

[56] References Cited

U.S. PATENT DOCUMENTS

| | | | |
|---|---|---|---|
| 2,413,204 | 12/1946 | Wolff | 126/390 |
| 2,573,211 | 10/1951 | Manler | 126/25 B |
| 2,597,477 | 5/1952 | Haislip | 126/25 B |
| 3,116,704 | 1/1964 | Byars et al. | 126/25 B |
| 3,167,040 | 1/1965 | Byars et al. | 126/25 B |
| 3,421,656 | 1/1969 | Asenbauer | 206/506 |
| 3,974,821 | 8/1976 | Storandt | 126/25 B |
| 4,023,553 | 5/1977 | London et al. | 126/25 B |

*Primary Examiner*—Ronald C. Capossela
*Attorney, Agent, or Firm*—Berman, Aisenberg & Platt

[57] ABSTRACT

The improved charcoal starter features a tubular housing having upper and lower rims, the latter intended to rest in a barbecue type charcoal burner. A grate is pivoted along its edge to an intermediate portion of the housing and has a leg depending perpendicularly from the opposite edge for a distance equal to the distance between the grate pivot and the lower rim of the housing. A bail-like handle is detachably pivoted to the upper portion of the housing. When the housing is lowered by the handle into the charcoal burner, the burner first contacts the leg and causes the grate automatically to turn to its horizontal position ready to receive charcoal for igniting. Subsequently, when the housing is lifted by the handle, the grate automatically is tilted by gravity to dump the ignited charcoal into the burner. An added feature of the starter is that the handle doubles as a support for a cooking pot so that the starter may be used as a camp stove. This feature is achieved by removing the handle from its pivot openings and seating the handle across the upper rim of the housing, notches being provided in the handle to retain the housing and handle in fixed relation.

12 Claims, 7 Drawing Figures

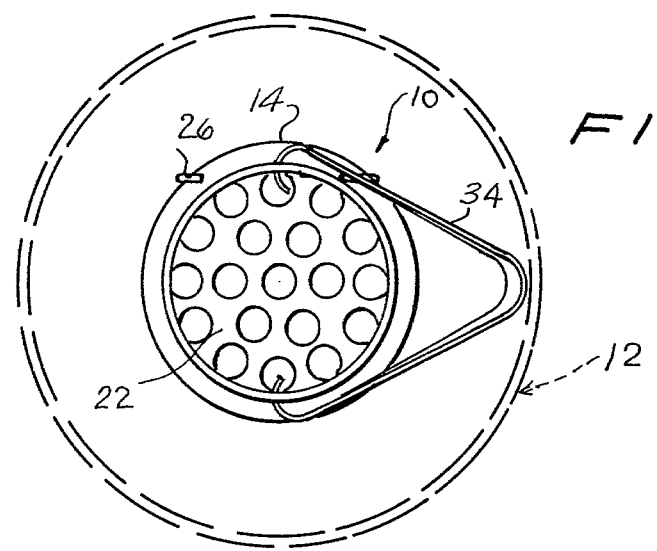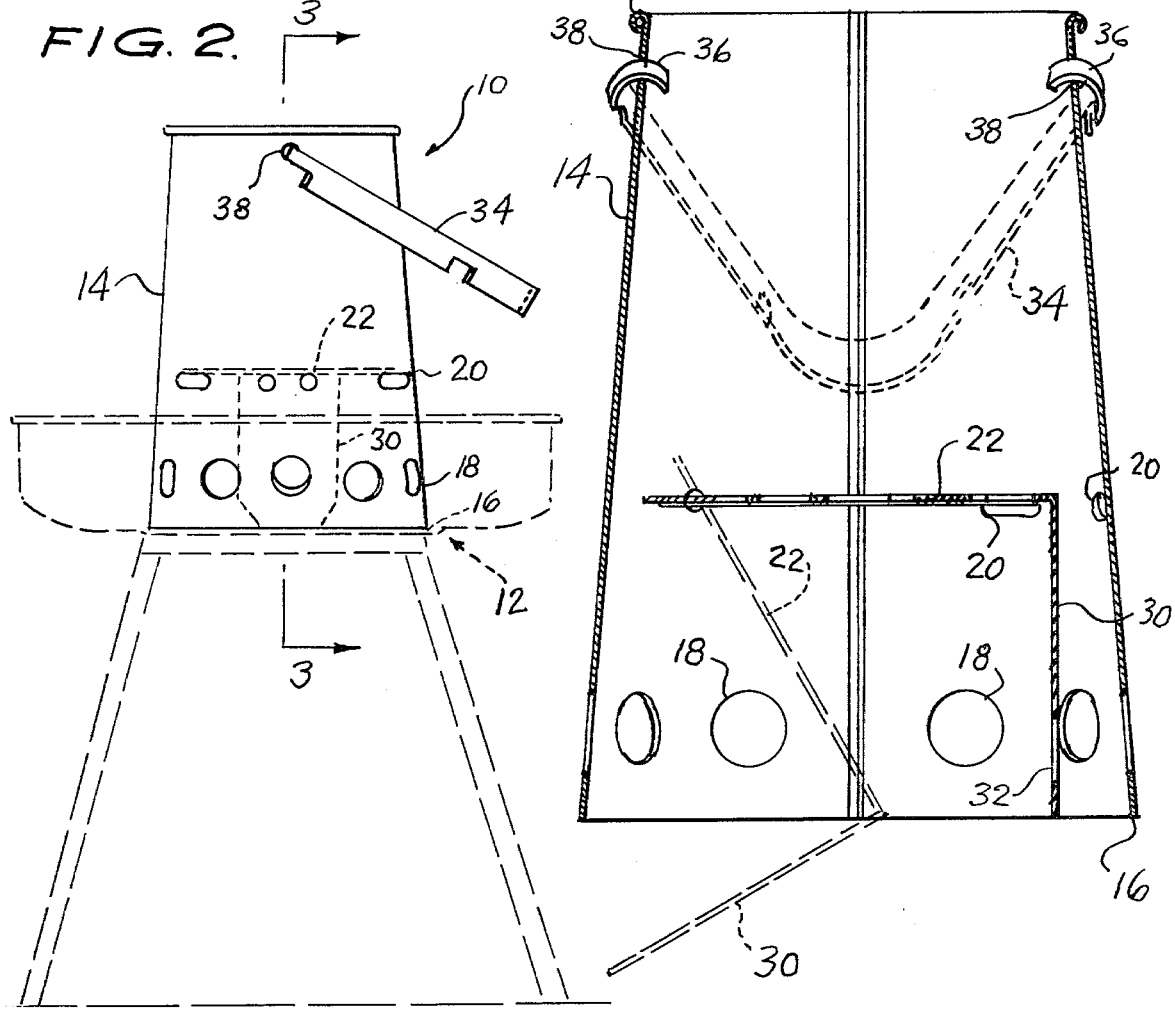

CHARCOAL LIGHTER

CROSS REFERENCE TO RELATED PATENTS

This invention is an improvement over those covered by U.S. Pat. No. 3,167,040, issued to G. B. Byars, Sr., et al., on Jan. 26, 1965, and U.S. Pat. No. 3,116,704, issued to G. B. Byars, Sr., et al., on Jan. 7, 1964.

FIELD OF THE INVENTION

The invention relates to fuel injection devices and, more particularly, to an apparatus for igniting charcoal for use in a barbecue type charcoal burner.

DESCRIPTION OF THE PRIOR ART

A number of conventional devices are known and available for quickly and easily igniting charcoal to be transferred to a barbecue type charcoal burner after ignition. These devices usually include a tubular housing of considerable height, but relatively small diameter with an intermediately disposed grate for holding the charcoal. Readily inflammable material is disposed below the grate and the housing acts as a flue to direct a high velocity draft of heated air including flames and combustion gases through the grate and charcoal seated thereon.

U.S. Pat. No. 3,116,704, mentioned above, is a device similar to that described in the preceding paragraph, but having a special grate structure to ease the transfer of ignited charcoal to the burner. The grate is formed in two parts, each having one side that forms a pivot and a second side that forms a latch for holding the grate part horizontal. Unlatching the two grate parts permits them to pivot inwardly and downwardly to dump the ignited charcoal into the burner. Disadvantages of this structure lie in the necessity to provide the grate in parts of special construction, to provide cooperating latching parts on the grate and housing, and to include latching and unlatching steps in the process of using the igniter.

U.S. Pat. No. 3,167,040, mentioned above, reveals a similar igniter, but having a one part grate hinged at one side and provided with a depending leg at the other side. In this device the handle is specially constructed to extend downwardly along the housing, enter the housing through an opening and latch under the leg to hold the grate horizontal until the charcoal is ignited. Subsequently, the handle is unlatched by turning and lifted to elevate the housing whereupon the grate tilts by gravity to dump the charcoal. Disadvantages of this structure lie in the necessity to provide a handle of special construction, to provide cooperating latching parts on the handle, housing and grate leg, and to include latching and unlatching steps in the process of using the igniter.

SUMMARY OF THE INVENTION

The present improvement invention overcomes the disadvantages of the prior inventions, as briefly outlined above, by providing a grate structure, similar to that of U.S. Pat. No. 3,167,040, with a dependent leg which hangs below the lower rim of the housing so as to strike the supporting surface of the burner when the igniter is lowered, thus automatically raising the grate to its horizontal operating position. After the charcoal is ignited, lifting the housing permits the grate to tilt downwardly by gravity to dump the charcoal. No special latching structure is required on the grate, the leg, the housing or the handle. The operation is entirely automatic, and the process of using the device is not delayed by latching and unlatching steps. An added feature is the design of the handle which enables it to double as a cooking pot support by removing it from its pivot openings and seating it across the rim of the housing.

From the above, it will be apparent that a primary object of the invention is to provide an improved charcoal igniter which overcomes the defects and disadvantages of prior art devices, as briefly outlined above.

A further important object of the invention is to provide an improved igniter which operates automatically to position the grate horizontally upon being lowered onto a support surface, and automatically to tilt the grate and dump the ignited charcoal upon being elevated from the support surface.

A still further important object of the invention is to increase the usefulness of the igniter by enabling it to double as a camp stove through use of a detachable handle which upon removal, is affixed across the upper rim of the igniter to act as a support for a cook pan or pot.

Another important object of the invention lies in the provision of an improved igniter, having the above described characteristics, which is of simplified construction, easy and inexpensive to fabricate and use, of durable construction requiring little or no maintenance, and which simplifies and speeds up the process of using the igniter by eliminating latching and unlatching steps.

BRIEF DESCRIPTION OF THE DRAWINGS

The novel features that are considered characteristic of the invention are set forth with particularity in the appended claims. The invention itself, however, both as to its method of operation, together with additional objects and advantages thereof, will best be understood from the following description of a specific embodiment, when read in connection with the accompanying drawings, wherein like reference characters indicate like parts throughout the several figures, and in which:

FIG. 1 is a plan view of a fuel igniter according to the invention seated on a charcoal burner of the barbecue type, shown in broken lines;

FIG. 2 is an elevational view of the igniter and burner of FIG. 1;

FIG. 3 is an enlarged sectional view of the igniter alone, taken on line 3—3 of FIG. 2 and looking in the direction of the arrows;

DESCRIPTION OF THE PREFERRED EMBODIMENT

Figure 4:
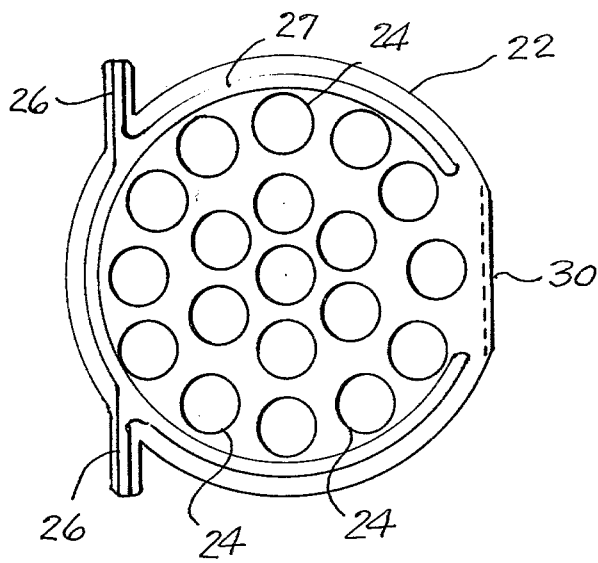
FIG. 4 is a plan view of the igniter grate alone.
Figure 6:
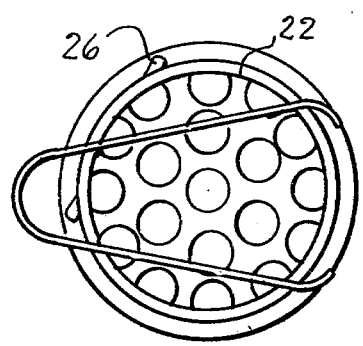
FIG. 6 is a top plan view of the igniter as in FIG. 5, but with the cooking pot removed.

Referring now more particularly to the drawings, the improved igniter is designated generally by reference character 10 and is shown seated on a conventional charcoal burner 12 of the barbecue type. The igniter 10 comprises a downwardly flaring tubular housing 14 of sheet metal, provided just above its lower rim 16 with a plurality of spaced air intake holes 18. A second series of smaller air intake holes 20 is provided near the center of the housing and just below a circular grate 22. The grate is formed of a metal plate having numerous openings 24 stamped therethrough for air passage. A pair of hinge pins 26 which are V-shaped in cross-section, and strengthening circular rib 27 are formed integrally in plate 22. The pins 26 extend from the grate periphery near one side (see FIG. 4) and pass through bearing openings 28 in housing 14. The grate 22 is also provided with a leg 30 which depends perpendicularly to the grate from the side opposite the hinge pins for a distance equal to the vertical distance between bearing opening 28 and bottom rim 16 of the housing. The leg 30 is a strap preferably bent from one piece of sheet metal forming grate 22, but obviously may be formed from a separate piece and integrally attached. An air aperture 32 is formed in the leg strap aligned with apertures 18 to permit air to move from the latter, through the leg toward the center of the housing. As indicated by the solid line showing of the grate and leg in FIG. 3, the leg will hold the grate horizontal when the housing is placed on a supporting surface, the leg bottom seating on the said surface inside the housing rim 16. When the housing is lifted from the support surface, the grate 22 will tilt downwardly by gravity carrying the leg with it to extend below the housing rim 16, as shown by the broken lines in FIG. 3.

Figure 5:
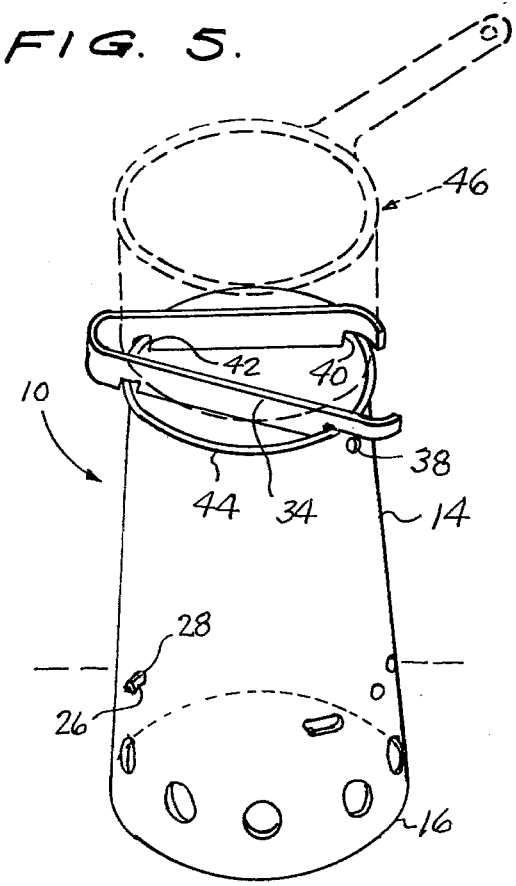
FIG. 5 is an elevational view of the igniter with the handle removed from its normal position and placed on the upper rim of the igniter to support a cooking pot, shown in broken lines.
Figure 7:
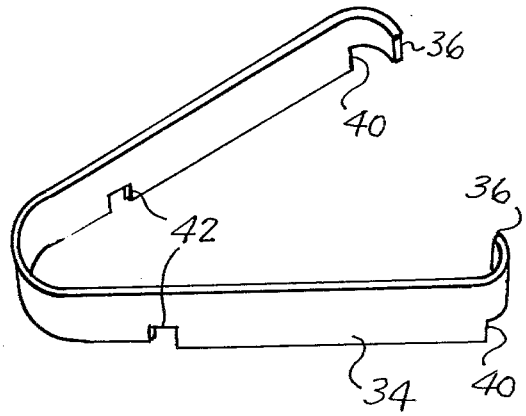
FIG. 7 is a perspective view of the handle alone.

The housing is provided with a lifting handle 34 formed of a resilient strap of metal or other suitable material. The strap 34 is bent into V-shape and has inturned lugs 36 at its ends which are pivotally retained in a pair of diametrically opposed bearing openings 38 in housing 14. Lugs 36 are defined by notches 40,40 extending inwardly from the outer edges of the handle ends. A second pair of notches 42,42 are formed in the lower edges of the strap handle to seat and grasp the upper rim 44 when the handle is removed from bearing openings 38 and seated across the rim of the housing as depicted in FIG. 5. In this position, a pot 46 is supportable for cooking above the igniter rim, the width of the strap 34 above notches 40,42 allowing ample space for circulation of heated air under and around the pot to exit from the housing. It should be noted that the resiliency of the handle strap serves to clamp the strap firmly to the housing by reason of the rim engaging the notch edges, particularly those of notches 40, with outwardly directed pressure of the strap. Preferably, the housing rim is beaded or curled for strengthening and enlargement to better seat in the notches, as shown at 44, FIG. 3.

In use of the charcoal starting, or igniting, device 10 inflammable material such as crumpled paper, or the like, is placed in the center of charcoal burner 12 and the igniter 14 held by handle 34 turned to an upwardly, vertical position, is lowered into the burner. The leg 30 dangling below rim 16 will strike the bottom of the burner and continued lowering of the housing causes the leg to automatically elevate the grate to horizontal position as depicted in solid lines in FIG. 3. Charcoal briquettes may then be placed on the grate 22 through the open top of the housing. The crumpled newspaper is then ignited by inserting a lighted match through one of the apertures 18, and the combustion of the newspaper creates intense heat in the region of the grate to ignite the briquettes aided by air circulation into the housing through apertures 18 and 20 and upward movement of air and gaseous combustion products of the paper upwardly through the gate and through the relatively tall stack formed by the housing 14.

After the charcoal briquettes have been ignited, the handle 34 is grasped and lifted to elevate the housing from the bottom support surface of the burner 12. This allows the grate to rotate by gravity on hinge pins 26 and drop to the depending position shown in broken lines in FIG. 3, depositing the ignited charcoal in the burner 12 where it is employed in the usual manner for barbecuing, or other types of cooking. It should be noted that the grate movements, to horizontal position for holding charcoal to be ignited, and to downturned charcoal dumping position are both entirely automatic being engendered by lowering and lifting the device as a whole, and without the intervention of other time consuming steps such as latching and unlatching.

Should it be desired to utilize the igniter as a small camp stove either on or away from the burner 12, it is merely necessary to load the housing with inflammatory material and charcoal as previously described, and then spread the legs of handle 34 to remove the lugs 36 from their openings 38. The handle is then placed across the upper rim housing, squeezing the legs slightly toward one another so that the rim seats in notches 40,42, as depicted in FIG. 5, for support of a cook pan 46. After cooking has been completed, the pan 46 is lifted from handle 34. The ends of the handle are squeezed to ungrasp the notches 40,42 from rim 44, and the handle lugs 36 are reinserted in holes 38. The device 10 may then be lifted to dump the remains of the charcoal.

While a specific embodiment of an improved charcoal igniter has been disclosed in the foregoing description, it will be understood that various modifications within the spirit of the invention may occur to those skilled in the art. Therefore, it is not intended that the invention be restricted to the exact showing of the drawings and description thereof, but the invention is considered to include reasonable and obvious equivalents.

What is claimed is:

1. A charcoal starter comprising a tubular housing of substantial height having an upper rim and a lower rim and adapted to rest vertically with its lower rim disposed on a subjacent supporting surface, a grate pivoted in the housing, depending leg means fixedly secured to the grate and having a lower edge by lying in the plane of said lower rim of the housing when the grate is substantially horizontal, said leg depending below said lower rim when the housing is lifted above the supporting surface, and handle means attached to an upper portion of said housing, said handle means comprising means for removably attaching said handle means to said housing and means for seating said handle means on the upper rim of said housing for supporting a pot or pan, whereby said handle means may be grasped to lower the housing onto said supporting surface causing the lower edge of said leg means to engage the supporting surface and automatically turn the grate to its horizontal position ready to receive charcoal for igniting, and subsequent grasping and lifting of said handle means automatically causes the grate, by gravity to tilt downwardly about its pivot to dump the ignited charcoal onto the supporting surface.

2. A charcoal starter as set forth in claim 1, wherein said grate comprises a circular metal plate of lesser diameter then the internal diameter of said housing, said plate having a plurality of openings therethrough for passage of air, pivot means connected to said plate near its periphery and having extensions beyond said periphery seated in bearing openings in the housing, said leg means comprising a straight strap affixed to the periphery of the grate diametrically opposite to said pivot means and extending perpendicularly from the grate for a distance equal to the distance between said gearing openings and the bottom rim of the housing.

3. A charcoal starter, according to claim 2, wherein a series of apertures are formed in the lower portion of said housing for admission of air into the housing below the grate when horizontally supported, said strap forming the leg means for the grate having an opening therethrough substantially aligned with one of said apertures.

4. A charcoal starter, according to claim 1, wherein said handle means comprises a V-shaped member of resilient material whose legs are formed at their ends with inturned lugs which are retained in pivot openings in the upper portion of the housing by the inherent resiliency of said V-shaped member so that the member can be swung from a dependent position alongside the housing to an upwardly extended position for lifting or carrying the housing, said V-shaped member being spreadable to remove the lugs from the pivot openings so that the handle may be seated across the upper rim of the housing to act as a support for a pot or pan.

5. A charcoal starter, according to claim 4, wherein notches are formed in said V-shaped member to receive the upper rim of the housing and hold the handle in its pot supporting position.

6. A charcoal starter, according to claim 5, wherein said handle means is a metal strap bent into V-shape, the strap being supported on edge when seated on the housing rim to support a pot above the rim for ample outflow of hot air around the pot, said notches being formed in one edge of said strap.

7. A charcoal starter, according to claim 6, wherein one pair of said notches is formed in the ends of the strap extending inwardly from the end edges, said one pair of notches also forming said lugs which define the pivots of the handle means.

8. A charcoal starter, comprising a tubular housing of substantial height having a grate disposed therein between its upper and lower rims, and handle means attached to an upper portion of said housing, said handle means attached to an upper portion of said housing, said handle means including a bail-like member detachably pivoted to the housing and removable therefrom and means for seating said handle means on the upper rim of the housing for supporting a pot or pan.

9. A charcoal starter, according to claim 8, wherein said handle means comprises a V-shaped member of resilient material whose legs are formed at their ends with inturned lugs which are retained in pivot openings in the housing by the inherent resiliency of said V-shaped member, said member being spreadable to remove the lugs from the pivot openings so that the member may be seated across the upper rim of the housing to act as a support for a pot or pan.

10. A charcoal starter, according to claim 9, wherein notches are formed in said V-shaped member to receive the rim of the housing and hold the handle means in its pot supporting position.

11. A charcoal starter, according to claim 10, wherein said handle means is formed of a metal strap bent into V-shape, the strap being supported on edge when seated on the housing rim to hold a supported pot above the rim for amply outflow of hot air around the pot, said notches being formed in one edge of the strap.

12. A charcoal starter, according to claim 11, wherein one pair of said notches is formed in the ends of the strap extending inwardly from the end edges, said one pair of notches also forming said lugs which define the pivots of the handle means.

* * * * *